US009621354B2

(12) United States Patent
Mosko

(10) Patent No.: US 9,621,354 B2
(45) Date of Patent: Apr. 11, 2017

(54) RECONSTRUCTABLE CONTENT OBJECTS

(71) Applicant: CISCO SYSTEMS, INC., San Jose, CA (US)

(72) Inventor: Marc E. Mosko, Santa Cruz, CA (US)

(73) Assignee: CISCO SYSTEMS, INC., San Jose, CA (US)

(*) Notice: Subject to any disclaimer, the term of this patent is extended or adjusted under 35 U.S.C. 154(b) by 139 days.

(21) Appl. No.: 14/334,386

(22) Filed: Jul. 17, 2014

(65) Prior Publication Data
US 2016/0020907 A1 Jan. 21, 2016

(51) Int. Cl.
H04L 29/00 (2006.01)
H04L 9/32 (2006.01)
H04L 29/06 (2006.01)
H04L 29/08 (2006.01)

(52) U.S. Cl.
CPC .......... H04L 9/3247 (2013.01); H04L 63/123 (2013.01); H04L 63/20 (2013.01); H04L 67/28 (2013.01); H04L 65/4084 (2013.01); H04L 67/04 (2013.01)

(58) Field of Classification Search
CPC .................................. G06F 17/00; H04L 9/32
USPC ......................................................... 713/176
See application file for complete search history.

(56) References Cited

U.S. PATENT DOCUMENTS

| 817,441 | A | 4/1906 | Niesz |
|---|---|---|---|
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.

(Continued)

Primary Examiner — Anthony Brown
Assistant Examiner — Michael D Anderson
(74) Attorney, Agent, or Firm — Patent Capital Group

(57) ABSTRACT

One embodiment of the present invention provides a system for delivering a content piece over a network using a set of reconstructable objects. During operation, the system obtains a metadata file that includes a set of rules; generates the set of reconstructable objects for the content piece based on the set of rules included in the metadata file; cryptographically signs the set of reconstructable objects to obtain a set of signed reconstructable objects; and delivers, over the network, the set of signed reconstructable objects along with the metadata file to a recipient, thereby enabling the recipient to extract and store a copy of the content piece and then to reconstruct the set of signed reconstructable objects from the stored copy of the content piece and the metadata file.

24 Claims, 8 Drawing Sheets

(56) References Cited

U.S. PATENT DOCUMENTS

| | | |
|---|---|---|
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 * | 12/2006 | Chadwick ......... G06F 17/30017 |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |

(56) References Cited

U.S. PATENT DOCUMENTS

| | | |
|---|---|---|
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |

(56) References Cited

U.S. PATENT DOCUMENTS

| | | |
|---|---|---|
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vander Linden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |

(56) References Cited

U.S. PATENT DOCUMENTS

| | | |
|---|---|---|
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1* | 12/2015 | Mosko ............ H04L 9/3242 |
| | | 713/189 |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Shih, Eugene et al., 'Wake on Wireless: An Event Driven Energy Saving Strategy for Battery Operated Devices', Sep. 23, 2002, pp. 160-171.

Jacobson, Van et al., "Content-Centric Networking, Whitepaper Describing Future Assurable Global Networks", Palo Alto Research Center, Inc., Jan. 30, 2007, pp. 1-9.

(56) References Cited

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," In Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (p. 3843).
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Walfish, H. Balakrishnan, and S. Shenker, "Untangling the web from DNS," in Proc. USENIX NSDI 2004, Oct. 2010, pp. 735-737.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

(56) References Cited

OTHER PUBLICATIONS

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
D. Trossen and G. Parisis, "Designing and realizing and information-centric Internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
RTMP (2009). Available online at http://wwwimages.adobe.com/www.adobe.com/content/dam/Adobe/en/devnet/rtmp/ pdf/rtmp specification 1.0.pdf.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011, pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]—[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, 24 Sep. 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, 23 Oct. 2013, pp. 1-5.

(56) References Cited

OTHER PUBLICATIONS

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

* cited by examiner

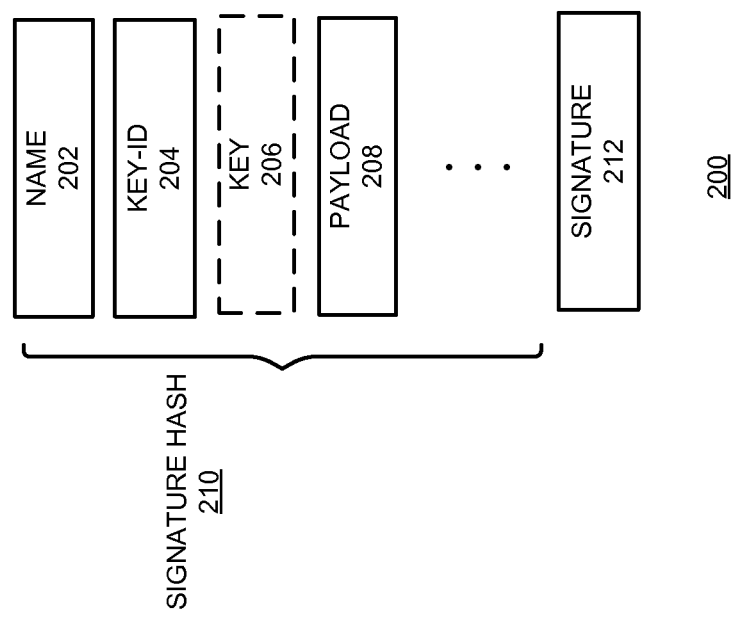

RECONSTRUCTABLE CONTENT OBJECTS

BACKGROUND

Field

The present disclosure relates generally to a content-centric network (CCN). More specifically, the present disclosure relates to a system and method for implementing reconstructable Content Objects in content-centric networks (CCNs).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-centric networking (CCN), an exemplary ICN architecture, brings a new approach to content transport. Instead of viewing network traffic at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, it is desirable that the intermediate node of the recipient of a content piece caches the received popular content to respond to future requests. However, the self-authentication nature of CCN requires that the content be stored in both the ready-to-use form and the Content Object form, resulting in storage of large sets of duplicated data.

SUMMARY

One embodiment of the present invention provides a system for delivering a content piece over a network using a set of reconstructable objects. During operation, the system obtains a metadata file that includes a set of rules; generates the set of reconstructable objects for the content piece based on the set of rules included in the metadata file; cryptographically signs the set of reconstructable objects to obtain a set of signed reconstructable objects; and delivers, over the network, the set of signed reconstructable objects along with the metadata file to a recipient, thereby enabling the recipient to extract and store a copy of the content piece and then to reconstruct the set of signed reconstructable objects from the stored copy of the content piece and the metadata file.

In a variation on this embodiment, the set of rules includes one or more of: a rule that specifies how to chunk the content piece, with a respective chunk of the content piece forming a payload of a corresponding reconstructable object; a rule that defines a naming convention; a rule that specifies a signing key; a rule that specifies whether to include a secure catalog; and a rule that specifies how to generate the secure catalog based on the set of reconstructable objects.

In a further variation, cryptographically signing the set of reconstructable objects involves using the specified signing key to sign each reconstructable object.

In a further variation, cryptographically signing the set of reconstructable objects involves using the specified signing key to sign the secure catalog.

In a variation on this embodiment, the network is a content-centric network (CCN), and the set of reconstructable objects conforms to a CCN standard.

One embodiment of the present invention provides a system for reconstructing a set of reconstructable objects representing a content piece. During operation, the system receives a set of signed reconstructable objects and an associated metadata file, extracts payloads and one or more signatures from the set of received signed reconstructable objects, assembles a copy of the content piece using the extracted payloads, stores the copy of the content piece, the metadata file, and the extracted one or more signatures. The system then discards the set of received signed reconstructable objects. In response to receiving a request for the content piece, the system reconstructs the set of signed reconstructable objects based on the copy of the content piece, the metadata file, and the extracted one or more signatures.

In a variation on this embodiment, the set of rules includes one or more of: a rule that specifies how to chunk the content piece, with a respective chunk of the content piece forming a payload of a corresponding reconstructable object; a rule that defines a naming convention; a rule that specifies a signing key; a rule that specifies whether to include a secure catalog; and a rule that specifies how to generate the secure catalog based on the set of reconstructable objects.

In a further variation, extracting the one or more signatures from the set of received signed reconstructable objects involves extracting a signature from each signed reconstructable object. The system further verifies the signature based on the specified signing key.

In a further variation, reconstructing the set of signed reconstructable objects involves inserting an extracted signature into each reconstructable object.

In a further variation, extracting the one or more signatures from the set of received signed reconstructable objects involves extracting a signature from the secure catalog. The system verifies the signature based on the specified signing key.

In a further variation, the system discards the secure catalog along with the set of received signed reconstructable objects. In response to receiving a request for the content piece, the system regenerates the secure catalog based on the rule that specifies how to generate the secure catalog.

In a further variation, reconstructing the set of signed reconstructable objects involves inserting an extracted signature into the regenerated secure catalog.

In a variation on this embodiment, the network is a content-centric network (CCN), wherein the set of reconstructable objects conforms to a CCN standard.

BRIEF DESCRIPTION OF THE FIGURES

FIG. 2 presents a diagram illustrating an exemplary Content Object in content-centric networks (CCNs).

In the figures, like reference numerals refer to the same figure elements.

DETAILED DESCRIPTION

Overview

Figure 1:
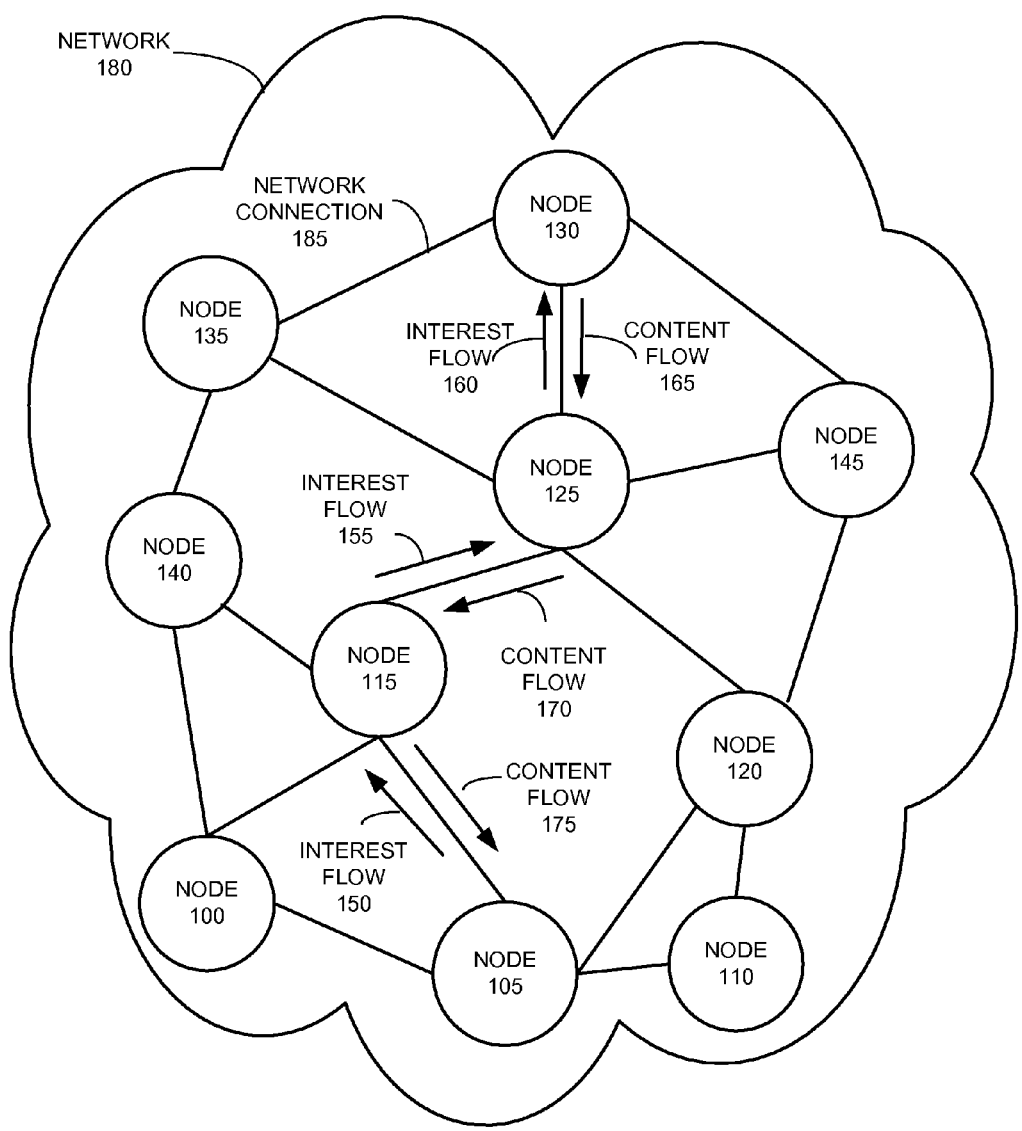
FIG. 1 illustrates an exemplary network architecture, in accordance with an embodiment of the present invention.

Embodiments of the present invention provide a system and method for implementing reconstructable Content Objects. More specifically, the system uses a set of metadata to describe how to publish the user data as Content Objects over the CCN networks. The metadata specifies the number of bytes included in each Content Object, the timestamps used, the convention for naming the Content Objects, and other parameters that may be included in the Content Objects. When a node publishes a piece of content over the network, it constructs a set of Content Objects based on a set of rules included in a metadata file, and creates a set of signatures, one for each Content Object. A first requester requesting the content piece receives the metadata file along with the Content Objects that contain the user data and the original publisher's signatures. Instead of storing all the Content Objects, the first requester extracts user data from the received Content Objects, and stores the extracted user data in a form that is ready to be used by an associated application. The requester also stores the received metadata and cryptographic signatures. When a different requester requests the content piece from the first requester, the first requester can reconstruct the original set of Content Objects based on the user data and information contained in the metadata, and pair the cryptographic signatures to corresponding Content Objects. The reconstructed Content Objects and the metadata file can be transmitted to the different requester, which can then use, store, and retransmit the user data when needed. In this way, embodiments of the present invention allow a node to store received content in its original form (without CCN headers) using minimum additional storage beyond the original file size while still being able to reproduce exactly the set of original Content Objects as published by the content publisher. Note that the phrase "reproduce exactly" means that the Content Objects are identical, down to their hash-based self-certified names.

In general, CCN uses two types of messages: Interests and Content Objects. An Interest carries the hierarchically structured variable-length identifier (HSVLI), also called the "name" or the "CCN name" of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICHALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. Note that the Content Object is not the same as a content component. A Content Object has a specifically defined structure under CCN protocol and its size is normally the size of a network packet (around 1500 bytes for wide area networks and 8000 bytes for local area networks and with fragmentation), whereas a content component is a general term used to refer to a file, which can be an embedded object of a web page. For example, a web page may include a number of embedded objects, such as image or video files. Each embedded object is a content component and may span multiple Content Objects.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

FIG. 1 illustrates an exemplary network architecture, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an endpoint representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

Reconstructable Content Objects

In CCN, content flows through the network in the form of Content Objects, with each Content Object being a data packet having a well-defined format and size. FIG. 2 presents a diagram illustrating an exemplary Content Object in content-centric networks (CCNs). In FIG. 2, Content Object 200 includes a name component 202, a key-ID component 204, an optional key component 206, a payload component 208, other components, and a signature component 212. Name component 202 is a non-cryptographic user-assigned string, which can be an HSVLI in a human-readable form or a flat name. Key-ID component 204 identifies a public key used to sign Content Object 200. The public key can be optionally included in Content Object 200 as key component 206. Payload component 208 includes the user data. Content Object 200 may also include other components (not shown in FIG. 2), such as a timestamp field indicating the time of the last modification. Signature component 212 is a cryptographic signature that binds all other components in Content Object 200. The signature can be generated using an RSA scheme. For example, the publisher of the content can generate the signature using its private key, which is verifiable using public key 206. Note that, instead of signing all the bytes, the signature is usually generated by signing a hash of Content Object 200 (minus signature component 212), shown as a signature hash 210.

When a requester requests a content piece, such as a document, an image file, a video or audio file, or an application-specific data file, over the CCN, it often receives multiple Content Objects transmitted from the content provider, which can be the original content publisher or a node that stores a copy of the content piece. The payload of the received Content Objects contains the content data, with each Content Object containing a chunk of the data file. Upon receiving the multiple Content Objects, the requester, now the content receiver, needs to extract the content data from the Content Objects, assemble, and store the content data as a normal file in its original format on the local machine, such that the corresponding application can use the data file. For example, if the data file is a JPEG image file, the requester of the JPEG image file may receive multiple Content Objects with each Content Object carrying a portion of the JPEG image file in its payload. The receiver can then extract the portions of the JPEG image file from the received Content Objects, assemble the extracted portions into a complete JPEG image file, and store the assembled JPEG image file such that an image-reading application can open the JPEG image file to show the image.

On the other hand, in CCN, it is desirable that the content receiver also caches the Content Objects such that the content receiver may respond to future Interests for the content piece by returning the cached Content Objects. Note that, because the Content Objects are cryptographically signed by the original publisher, they need to be saved in their original forms so that future receivers of the content can verify the authenticity of the content by verifying those signatures. If the current receiver only keeps the payload of the Content Objects and throws away the wrappers (which can include the name, the key-ID/key, the signature, etc.), the current receiver cannot reconstitute those signatures. Even if the current receiver stores the signatures, they cannot be paired with the original Content Objects to enable the authentication process.

However, storing the Content Objects along with the user data means that the current content receiver, after it receives the content piece, needs to store the same content data in two different forms: one in the form of a normal data file that is application-ready and the other in the form of Content Objects. This creates undesired redundancy where a potentially large set of duplicated data is stored on the local system. To avoid this redundancy, in some embodiments of the present invention, the system delivers content as reconstructable Content Objects that allow a receiver to store the content in the application-ready format and reconstruct original Content Objects when re-transmitting the content to other nodes. In order to generate the reconstructable Content Objects, in some embodiments, a metadata file that includes a set of rules is implemented.

Figure 3A:
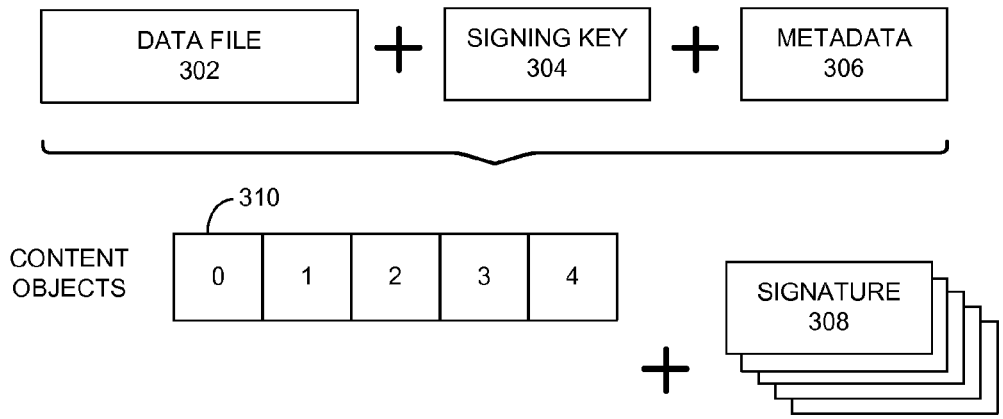
FIG. 3A presents a diagram illustrating how a content publisher creates a set of reconstructable Content Objects for a content piece, in accordance with an embodiment of the present invention.

FIG. 3A presents a diagram illustrating how a content publisher creates a set of reconstructable Content Objects for a content piece, in accordance with an embodiment of the present invention. In FIG. 3A, a publisher is publishing a data file 302 over the CCN network. To do so, the publisher needs to generate a plurality of Content Objects that conform to the CCN protocol and/or certain criteria defined by the publisher. In some embodiments, generating the plurality of Content Objects involves applying a set of rules included in a metadata file 306. The rule set may specify how to chunk the original data file (such as how many bytes per chunk) and what to fill in all the fields of a Content Object. For example, the rule set may specify how to fill the creation-time field in a Content Object and when to use an end-of-segment field. Moreover, the rule set may specify the format of the names of the Content Objects. In some embodiments, all Content Objects may have a same CCN base name, and the CCN name for a particular Content Object can be the base name plus the corresponding chunk number. Additionally, the rule set may specify the signing key, and may specify whether to include the public key of the signing key in one or more Content Objects. In some embodiments, the rule set may specify that the first Content Object include a copy of the public key. Based on the set of rules included in metadata file 306, the publisher generates an initial set of Content Objects for data file 302, each Content Object including a chunk of data file 302. For example, a Content Object 310 includes chunk 0 of data file 302. Note that metadata file 306 may be a system default file, or a file generated by the content publisher in order to include a set of user-definable rules.

Subsequent to the generation of the initial set of Content Objects, the publisher cryptographically signs, using a signing key 304, each Content Object, generating a set of signatures, such as a signature 308. In some embodiments, signing key 304 may be a private signing key of a public/private key pair. In further embodiments, signing a Content Object may involve signing a hash value of the Content Object. Note that, once generated, a signature is included in the corresponding Content Object, being an actual part of the Content Object. To avoid ambiguity, a Content Object that includes the signature is also called a signed Content Object.

Figure 3B:
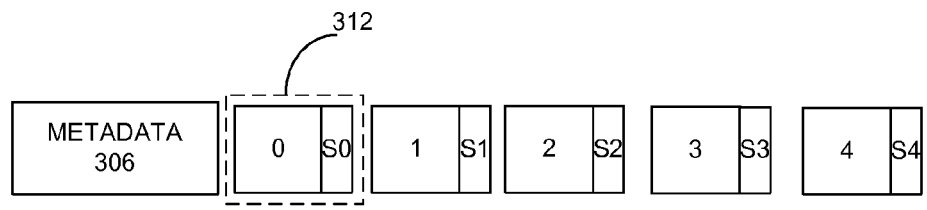
FIG. 3B presents a diagram illustrating an exemplary response to a content request, transferred over the network, in accordance with an embodiment of the present invention.

FIG. 3B presents a diagram illustrating an exemplary response to a content request, transferred over the network, in accordance with an embodiment of the present invention. More specifically, when the publisher of data file 302 responds to a set of Interests for Content Objects that represent data file 302, the publisher transfers over the network these Content Objects along with metadata file 306. In some embodiments, the signature for each Content Object is transferred together with the corresponding Content Object. For example, the Content Object that carries chunk 0 of data file 302 is combined with signature S0 to form a signed Content Object 312. Note that metadata 306 is transferred over the network in the form of CCN Content Objects as well, and may have been digitally signed by the content publisher.

Upon receiving metadata file 306 and the signed Content Objects, the receiver can authenticate the signed Content Objects by verifying the signatures. Subsequently, the receiver stores metadata 306, and extracts and stores the payload and signature of each signed Content Object. Payloads from the plurality of Content Objects that represents data file 302 are assembled to form a copy of data file 302 in the form that is ready to be used by an appropriate application. For example, if data file 302 is a JPEG image file, the assembled file will be a copy of the JPEG image file. The signatures are stored separately from metadata file 306 and the copy of data file 302. The receiver can then discard the received Content Objects. In other words, the recipient deconstructs each received Content Object by extracting and saving useful information (such as the payload and the catalog signature) while discarding redundant information (information that is included in the metadata file, such as the CCN name, the key-ID, and the secure catalog). This way, instead of storing content in both the user data form and the Content Object form, the content recipient only needs to store the content in its user data form along with the metadata file and the original signatures, thus significantly reducing the amount of storage space required for large content pieces. When the content receiver receives a request for the content, it can reassemble the original signed Content Objects, using information included in the metadata file and the signatures, and transfer the reassembled signed Content Objects over the network to the new content requester.

Figure 3C:
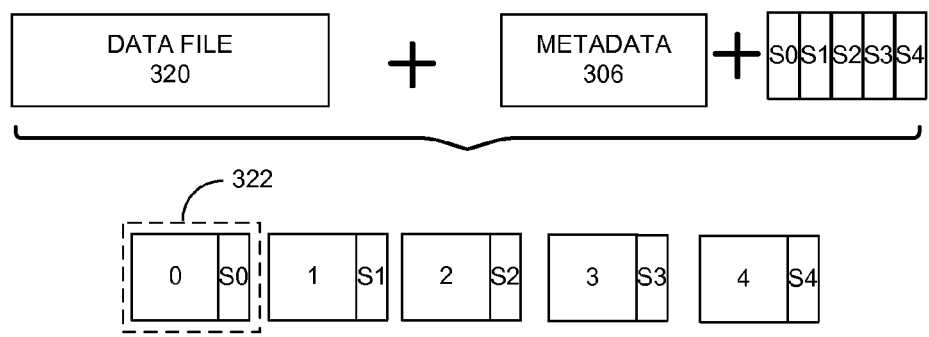
FIG. 3C presents a diagram illustrating how to reassemble the reconstructable Content Objects, in accordance with an embodiment of the present invention.

FIG. 3C presents a diagram illustrating how to reassemble the reconstructable Content Objects, in accordance with an embodiment of the present invention. In FIG. 3C, a device or a node stores a data file 320, metadata file 306, and a set of signatures associated with data file 320. Note that data file 320 is a copy of original data file 302, and is formed by extracting and assembling the payloads of a plurality of Content Objects representing data file 302. Metadata file 306 is received along with the plurality of Content Objects representing data file 302. The set of signatures is extracted from the plurality of signed Content Objects representing data file 302, each signature corresponding to a Content Object.

Upon receiving a request for the content, the device reassembles a plurality of signed Content Objects. Note that, in order for future recipients of the Content Object to be able to verify the authenticity of those Content Objects, the reassembled signed Content Objects need to be exact copies of the original signed Content Objects received by the device. In some embodiments, to accomplish this, the device applies the set of rules included in metadata file 306 to data file 320, generating an initial set of Content Objects with each Content Object corresponding to a chunk of data file 320. Subsequently, the device inserts the signatures into their corresponding Content Objects to form the final set of signed Content Objects that is ready for transmission over the network. For example, the Content Object that contains chunk 0 of data file 312 is combined with S0 to form a reassembled signed Content Object 322, which is a copy of signed Content Object 312. This final set of signed Content Objects can then be transmitted to the content requester along with metadata file 306. Note that transmitting the metadata file along with the signed Content Objects allows any future recipient of the Content Objects to store only the application data along with the signatures and the metadata file, but still have the ability to reconstruct the original signed Content Objects. Note that the metadata file and the signatures only add a small amount of data to the original data file, and require significantly less storage compared with the need to store the entire set of Content Objects.

In some embodiments, instead of creating a cryptographic signature for each Content Object, the content publisher may use a secure catalog, also known as an Aggregated Signing Object, to authenticate the Content Objects. More specifically, the content publisher can create the secure catalog by aggregating the hash values (such as SHA-256 hashes) of the Content Objects, and then signing, using a private key, the secure catalog to create a catalog signature. In some embodiments, the secure catalog can be the concatenation of the cryptographic hash for each Content Object. Note that a rule that defines how to generate the secure catalog can be included in the metadata file.

Figure 4A:
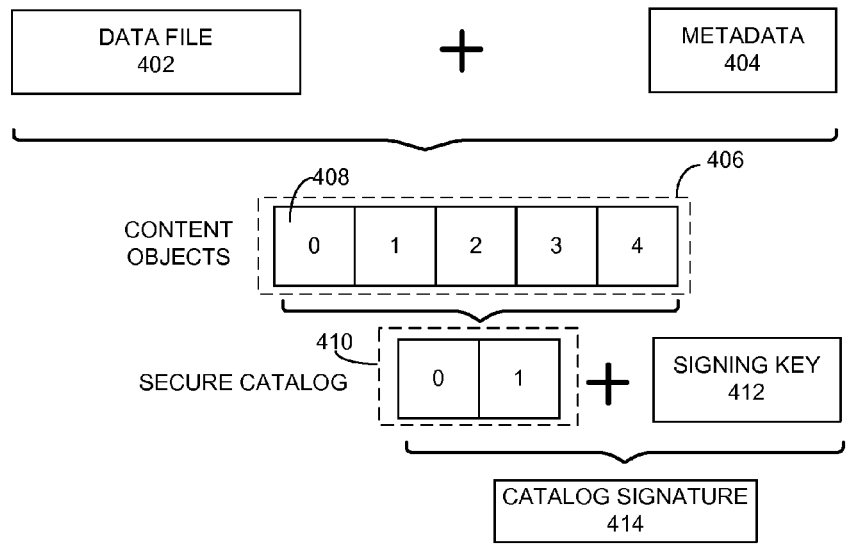
FIG. 4A presents a diagram illustrating how a content publisher creates a set of reconstructable Content Objects, in accordance with an embodiment of the present invention.

FIG. 4A presents a diagram illustrating how a content publisher creates a set of reconstructable Content Objects, in accordance with an embodiment of the present invention. In FIG. 4A, a publisher is publishing a data file 402 over the CCN network. Similar to what is shown in FIG. 3A, the publisher generates an initial set of Content Objects 406 based on a set of rules included in a metadata file 404. Each Content Object includes a chunk of data file 402. For example, a Content Object 408 includes chunk 0 of data file 402. Subsequently, the publisher can generate, based on a secure-catalog rule included in metadata file 404, a secure catalog 410 for initial set of Content Objects 406. Note that secure catalog 410 can span multiple Content Objects. In the example shown in FIG. 4A, secure catalog 410 spans two Content Objects. The publisher then creates a catalog signature 414 by signing, using a signing key 412, over secure catalog 410. In some embodiments, signing key 412 is the private key of a public/private key pair, and an identifier that identifies the corresponding public key can be included in metadata file 404. Note that, if secure catalog 410 spans multiple Content Objects, catalog signature 414 may include multiple signatures, one for each Content Object in secure catalog 410. In general, given data file 402, a metadata file 404, and a signing key 412, the content publisher generates a set of Content Objects representing data file 402, a secure catalog 410, and a catalog signature 414.

Figure 4B:
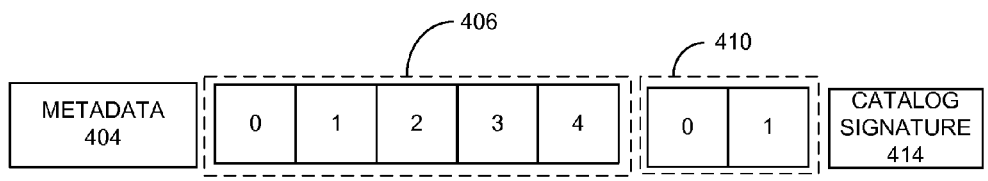
FIG. 4B presents a diagram illustrating an exemplary response to a content request, transferred over the network, in accordance with an embodiment of the present invention.

FIG. 4B presents a diagram illustrating an exemplary response to a content request, transferred over the network, in accordance with an embodiment of the present invention. More specifically, when the publisher of data file 402 responds to a set of Interests for Content Objects that represent data file 402, the publisher transfers over the network metadata file 404, set of Content Objects 406, secure catalog 410, and catalog signature 414. Note that if catalog signature 414 includes multiple signatures, each for an individual Content Object in secure catalog 410, the publisher may insert each signature into its corresponding Content Object, creating a signed secure-catalog Content Object. By verifying catalog signature 414, a recipient can first authenticate secure catalog 410, and then use secure catalog 410 to authenticate the plurality of Content Objects within set of Content Objects 406.

Once the authentication is completed, the recipient can store metadata file 404, extract and store the payload of each Content Object within set of Content Objects 406, and store catalog signature 414. Payloads from the plurality of Content Objects within set of Content Objects 406 are assembled to form data file 420, which is a copy of original data file 402. The recipient can then discard the received set of Content Objects 406 and secure catalog 410. In other words, the recipient deconstructs each received Content Object by extracting and saving useful information (such as the payload and the catalog signature), while discarding redundant information (information that is included in the metadata file, such as the CCN name, the key-ID, and the secure catalog). This way, instead of storing content in both the user data form and the Content Object form, the content recipient only needs to store the content in its user data form along with the metadata file and the signature for the secure catalog. Note that compared with the set of signatures for all Content Objects, the signature for the secure catalog occupies less storage space. Note that because the rule to generate the secure catalog is included in the metadata file, the recipient does not need to store the secure catalog itself. When this content recipient receives a request for the content, it can reassemble the original set of Content Objects and the signed secure-catalog Content Objects, using information included in the metadata file and the catalog signature, and forward the reassembled Content Object set and the signed secure-catalog Content Objects over the network to the new content requester.

Figure 4C:
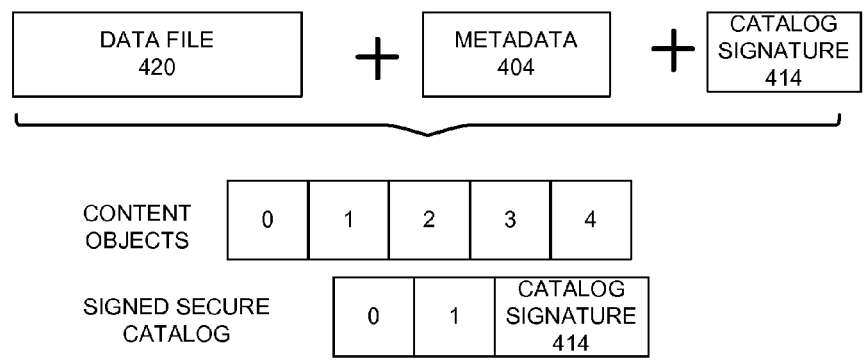
FIG. 4C presents a diagram illustrating how to reassemble the reconstructable Content Objects along with the secure catalog, in accordance with an embodiment of the present invention.

FIG. 4C presents a diagram illustrating how to reassemble the reconstructable Content Objects along with the secure catalog, in accordance with an embodiment of the present invention. In FIG. 4C, a device or a node stores a data file 420, metadata file 404, and a catalog signature 414 associated with data file 420. Note that data file 420 is a copy of original data file 402, and is formed by extracting and assembling the payloads of Content Objects within set of Content Objects 406. Metadata file 404 is received along with the set of Content Objects 406. Catalog signature 414 can be extracted from the signed secure-catalog Content Objects.

Upon receiving a request for the content, the device reassembles a plurality of Content Objects using data file 420 and metadata 404. In some embodiments, to accomplish this, the device applies a set of rules included in metadata file 404 to data file 420, generating a set of Content Objects with each Content Object corresponding to a chunk of data file 420. The device also generates a secure catalog based on the generated set of Content Objects and one or more rules included in metadata file 404. Subsequently, the device combines catalog signature 414 with the generated secure catalog to form the signed secure-catalog Content Objects, that are ready to be transmitted along with the set of Content Objects and the metadata. Similar to the example shown in FIG. 3C, the reconstructed Content Objects and signed secure-catalog Content Objects are exact copies of the received Content Objects representing the data file and the received signed secure-catalog Content Objects. No authentication information is lost during the reconstruction process.

Figure 5:
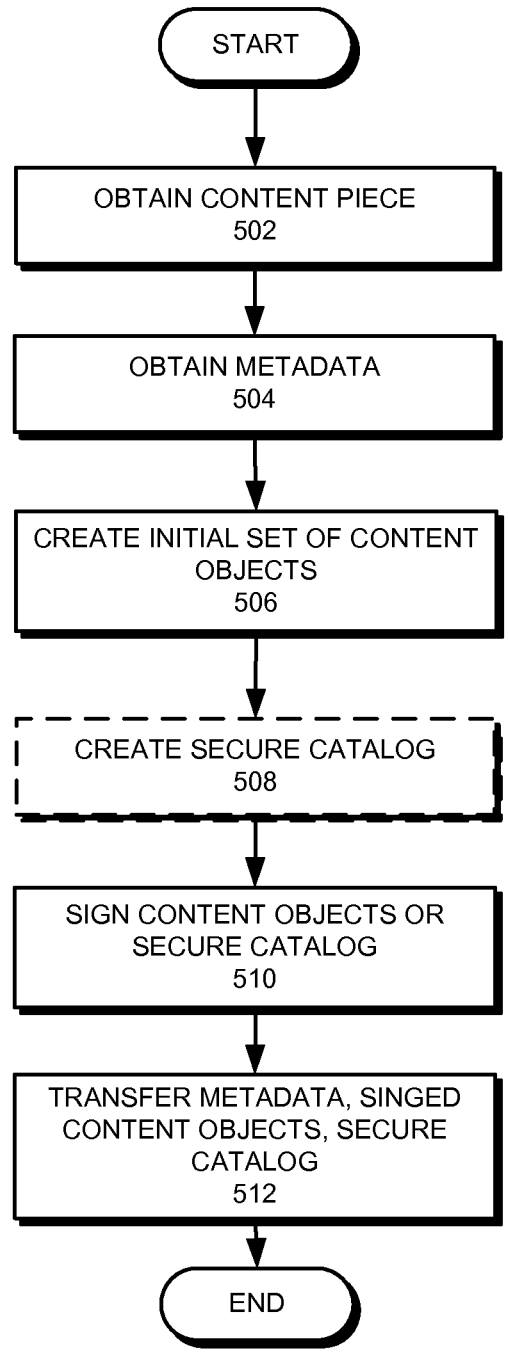
FIG. 5 presents a flowchart illustrating a process of creating a set of reconstructable Content Objects, in accordance with an embodiment of the present invention.

FIG. 5 presents a flowchart illustrating a process of creating a set of reconstructable Content Objects, in accordance with an embodiment of the present invention. During operation, a content publisher obtains a to-be-published content piece (operation 502). The publisher then creates or obtains a metadata file that includes a set of rules for constructing Content Objects (operation 504). In some embodiments, the set of rules may specify how to chunk the original data file (such as how many bytes per chunk), what to fill in all the fields of a Content Object, and the key(s) used to sign the Content Objects. Based on the rules, the publisher creates a set of initial Content Objects (operation 506). The publisher can then optionally create a secure catalog based on the initial Content Objects (operation 508). The publisher then generates one or more signatures by signing the Content Objects or, if possible, the secure catalog (operation 510). In response to a request for the content, the publisher transfers the metadata file, the signed Content Objects and, if possible, the signed secure-catalog Content Objects over the network (operation 512).

Figure 6:
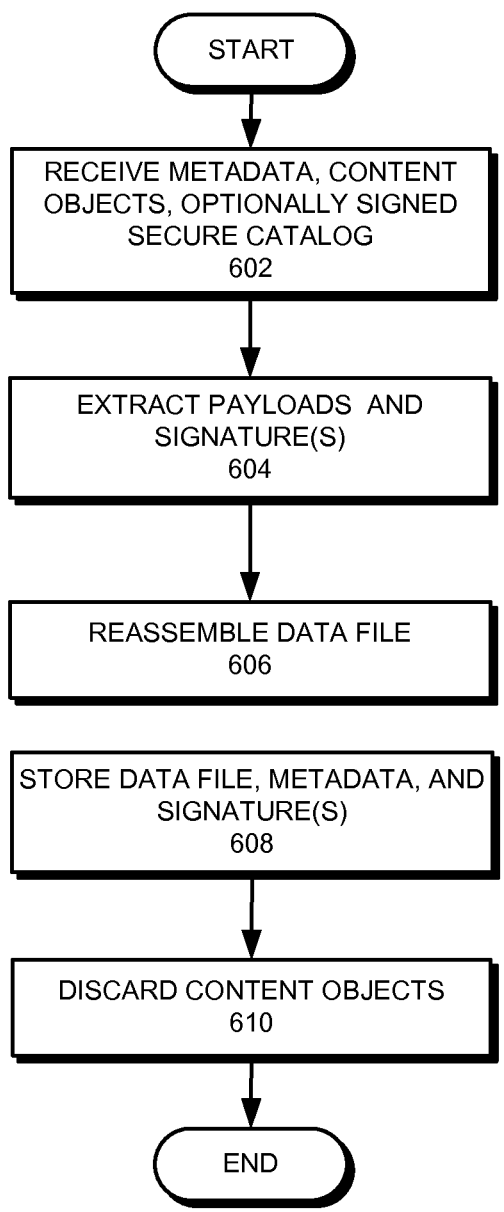
FIG. 6 presents a flowchart illustrating a process of storing a content piece and reconstruction information associated with the content piece, in accordance with an embodiment of the present invention.

FIG. 6 presents a flowchart illustrating a process of storing a content piece and reconstruction information associated with the content piece, in accordance with an embodiment of the present invention. During operation, a device or a node receives, over the network, a metadata file, a plurality of Content Objects, and possibly one or more signed secure-catalog Content Objects (operation 602). The device extracts payload and signature (if any) fields from each Content Object (operation 604), and reassembles a data file using the extracted payloads (operation 606). Note that the reassembled data file can be ready to be used by an appropriate application. Note that, if there are signed secure-catalog Content Objects, the system extracts the catalog signature from the secure-catalog Content Objects. Subsequently, the device stores the metadata file, the data file, and the extracted signature(s) (operation 608), and discards the received Content Objects and, if any, the signed secure-catalog Content Objects (operation 610).

Figure 7:
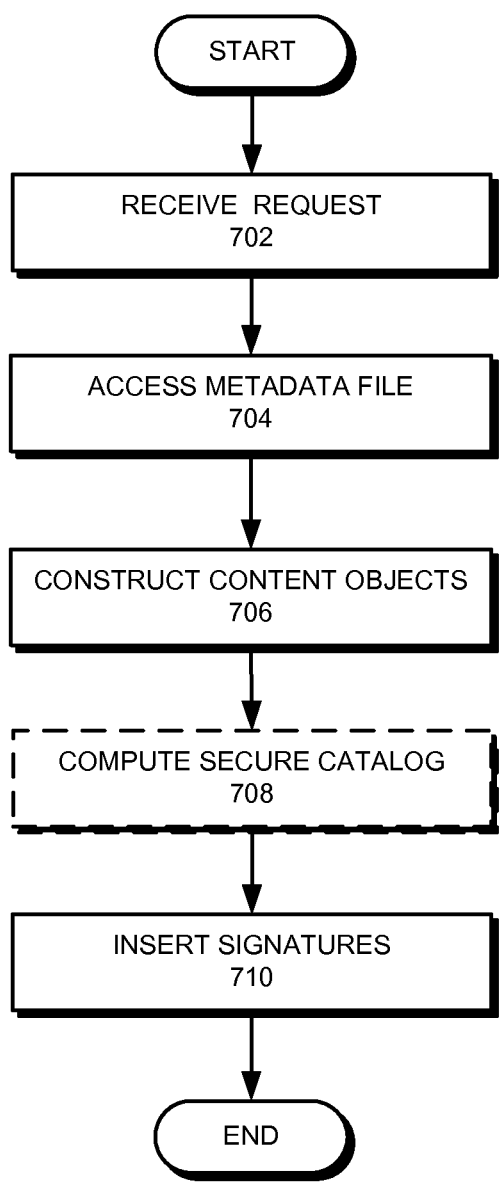
FIG. 7 presents a flowchart illustrating a process of reconstructing a set of Content Objects associated with a content piece, in accordance with an embodiment of the present invention.

FIG. 7 presents a flowchart illustrating a process of reconstructing a set of Content Objects associated with a content piece, in accordance with an embodiment of the present invention. During operation, a device or a node that stores a content piece receives a request for the content piece (operation 702). Note that this device is not the publisher of the original content piece, and the content piece is stored in a form that is ready to be used by an application as a data file. In response to the request, the device accesses a metadata file that stores a set of rules (operation 704), and constructs a set of initial Content Objects by applying the rules to the data file (operation 706). Note that the metadata file is received by the device along with the content piece, and specifies how to chunk the data file and how to fill in the various fields within each Content Object. Each data file chunk can be the payload of each Content Object. The device may optionally compute a secure catalog based on the initial set of Content Objects (operation 708). In some embodiments, the rules that govern the computation of the secure catalog are also stored in the metadata file. Subsequently, the device inserts the original publisher's signatures into appropriate Content Objects to form signed Content Objects (operation 710). Note that when the secure catalog is used, the device inserts a catalog signature into the secure-catalog Content Object to form a signed secure-catalog Content Object.

Note that optionally the original publisher may not send out meta data, and the receiving node may only receive regular Content Objects (non-reconstructable Content Objects). In such a situation, the receiving node that implements reconstructable Content Objects may infer the metadata from the received Content Objects, and create its own metadata on-the-fly. Similar to the process shown in FIG. 6, the receiving node stores the newly created metadata along with the data file containing the extracted payload of the Content Objects. When retransmitting the data file, this node may or may not include the newly created metadata. If the node chooses not to include the newly created metadata, subsequent receiving nodes would need to create their own metadata. If the node chooses to include the newly created metadata, it should include it in such a way that does not change the original signatures (stored separately from the payload) or the self-certified names of the reconstructed Content Objects. In some embodiments, this node can include a header in the unsigned part of the Content Objects to indicate that the metadata is available via a given link or that the metadata is embedded in the header (if enough space is provided).

Computer and Communication System

Figure 8:
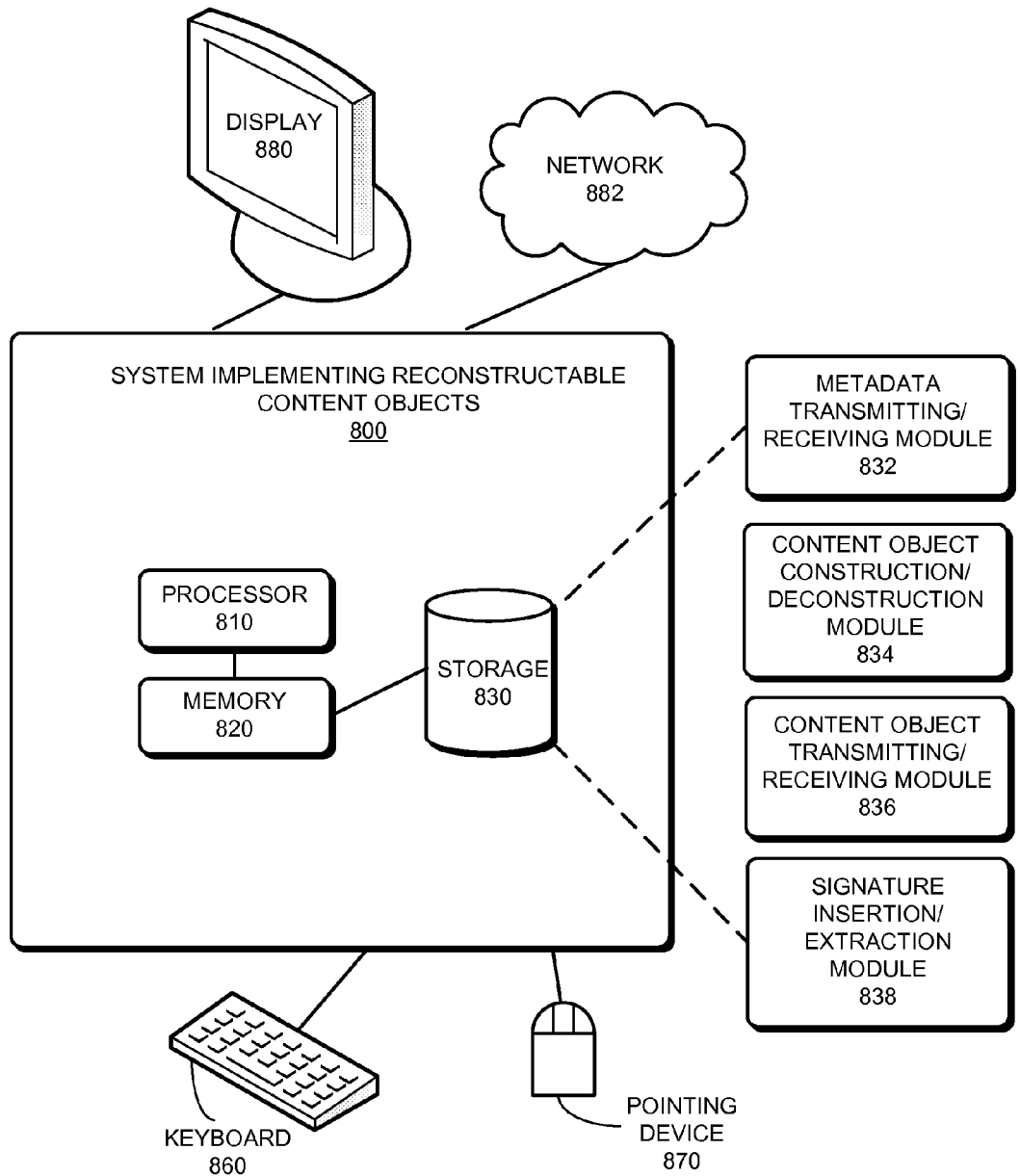
FIG. 8 illustrates an exemplary system that implements reconstructable Content Objects, in accordance with an embodiment of the present invention.

FIG. 8 illustrates an exemplary system that implements reconstructable Content Objects, in accordance with an embodiment of the present invention. A system 800 that implements reconstructable Content Objects comprises a processor 810, a memory 820, and a storage 830. Storage 830 typically stores instructions that can be loaded into memory 820 and executed by processor 810 to perform the methods mentioned above. In one embodiment, the instructions in storage 830 can implement a metadata transmitting/receiving module 832, a Content Object construction/deconstruction module 834, a Content Object transmitting/receiving module 836, and a signature insertion/extraction module 838, all of which can communication with each other through various means.

In some embodiments, modules 832, 834, 836, and 838 can be partially or entirely implemented in hardware and can be part of processor 810. Further, in some embodiments, the system may not include a separate processor and memory. Instead, in addition to performing their specific tasks, modules 832, 834, 836, and 838, either separately or in concert, may be part of general- or special-purpose computation engines.

Storage 830 stores programs to be executed by processor 810. Specifically, storage 830 stores a program that implements a system (application) for enabling all-in-one content download. During operation, the application program can be loaded from storage 830 into memory 820 and executed by processor 810. As a result, system 800 can perform the functions described above. System 800 can be coupled to an optional display 880 (which can be a touch screen display), keyboard 860, and pointing device 870, and can also be coupled via one or more network interfaces to network 882.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for delivering a content piece over a network using a set of reconstructable objects, the method comprising:
   obtaining, by a computer, a metadata file that includes a set of rules;
   generating the set of reconstructable objects for the content piece based on the set of rules included in the metadata file;
   cryptographically signing the set of reconstructable objects to obtain a set of signed reconstructable objects; and
   delivering, over the network, the set of signed reconstructable objects along with the metadata file to a recipient, thereby enabling the recipient to extract and store a copy of the content piece and then to reconstruct the set of signed reconstructable objects from the stored copy of the content piece and the metadata file.

2. The method of claim 1, wherein the set of rules includes one or more of:
   a rule that specifies how to chunk the content piece, wherein a respective chunk of the content piece forms a payload of a corresponding reconstructable object;
   a rule that defines a naming convention;
   a rule that specifies a signing key;
   a rule that specifies whether to include a secure catalog; and
   a rule that specifies how to generate the secure catalog based on the set of reconstructable objects.

3. The method of claim 2, wherein cryptographically signing the set of reconstructable objects involves using the specified signing key to sign each reconstructable object.

4. The method of claim 2, wherein cryptographically signing the set of reconstructable objects involves using the specified signing key to sign the secure catalog.

5. The method of claim 1, wherein the network is a content-centric network (CCN), and wherein the set of reconstructable objects conforms to a CCN standard.

6. A non-transitory computer-readable storage medium storing instructions that when executed by a computing device cause the computing device to perform a method for delivering a content piece over a network using a set of reconstructable objects, the method comprising:
   obtaining, by a computer, a metadata file that includes a set of rules;
   generating the set of reconstructable objects for the content piece based on the set of rules included in the metadata file;
   cryptographically signing the set of reconstructable objects to obtain a set of signed reconstructable objects; and
   delivering, over the network, the set of signed reconstructable objects along with the metadata file to a recipient, thereby enabling the recipient to extract and store a copy of the content piece and then to reconstruct the set of signed reconstructable objects from the stored copy of the content piece and the metadata file.

7. The computer-readable storage medium of claim 6, wherein the set of rules includes one or more of:
   a rule that specifies how to chunk the content piece, wherein a respective chunk of the content piece forms a payload of a corresponding reconstructable object;
   a rule that defines a naming convention;
   a rule that specifies a signing key;
   a rule that specifies whether to include a secure catalog; and
   a rule that specifies how to generate the secure catalog based on the set of reconstructable objects.

8. The computer-readable storage medium of claim 7, wherein cryptographically signing the set of reconstructable objects involves using a private key associated with the specified signing key to sign each reconstructable object.

9. The computer-readable storage medium of claim 7, wherein cryptographically signing the set of reconstructable objects involves using a private key associated with the specified signing key to sign the secure catalog.

10. The computer-readable storage medium of claim 6, wherein the network is a content-centric network (CCN), and wherein the set of reconstructable objects conforms to a CCN standard.

11. A computer-implemented method for reconstructing a set of reconstructable objects representing a content piece, comprising:
    receiving, by a computer, a set of signed reconstructable objects and an associated metadata file;
    extracting payloads and one or more signatures from the set of received signed reconstructable objects;
    assembling a copy of the content piece using the extracted payloads;
    storing the copy of the content piece, the metadata file, and the extracted one or more signatures;
    discarding the set of received signed reconstructable objects; and
    in response to receiving a request for the content piece, reconstructing the set of signed reconstructable objects based on the copy of the content piece, the metadata file, and the extracted one or more signatures.

12. The method of claim 11, wherein the set of rules includes one or more of:
    a rule that specifies how to chunk the content piece, wherein a respective chunk of the content piece forms a payload of a corresponding reconstructable object;
    a rule that defines a naming convention;
    a rule that specifies a signing key;
    a rule that specifies whether to include a secure catalog; and
    a rule that specifies how to generate the secure catalog based on the set of reconstructable objects.

13. The method of claim 12, wherein extracting the one or more signatures from the set of received signed reconstructable objects involves extracting a signature from each signed reconstructable object, and wherein the method further comprises verifying the signature based on the specified signing key.

14. The method of claim 13, wherein reconstructing the set of signed reconstructable objects involves inserting an extracted signature into each reconstructable object.

15. The method of claim 12, wherein extracting the one or more signatures from the set of received signed reconstructable objects involves extracting a signature from the secure catalog, and wherein the method further comprises verifying the signature based on the specified signing key.

16. The method of claim 12, further comprising:
    discarding the secure catalog along with the set of received signed reconstructable objects; and
    in response to receiving a request for the content piece, regenerating the secure catalog based on the rule that specifies how to generate the secure catalog.

17. The method of claim 16, wherein reconstructing the set of signed reconstructable objects involves inserting an extracted signature into the regenerated secure catalog.

18. The method of claim 11, wherein the network is a content-centric network (CCN), and wherein the set of reconstructable objects conforms to a CCN standard.

19. A computer system for reconstructing a set of reconstructable objects representing a content piece, the system comprising:
    a processor; and
    a storage device coupled to the processor and storing instructions which when executed by the processor cause the processor to perform a method, the method comprising:
        receiving, by a computer, a set of signed reconstructable objects and an associated metadata file;
        extracting payloads and one or more signatures from the set of received signed reconstructable objects;
        assembling a copy of the content piece using the extracted payloads;
        storing the copy of the content piece, the metadata file, and the extracted one or more signatures;
        discarding the set of received signed reconstructable objects; and
        in response to receiving a request for the content piece, reconstructing the set of signed reconstructable objects based on the copy of the content piece, the metadata file, and the extracted one or more signatures.

20. The system of claim 19, wherein the set of rules includes one or more of:
    a rule that specifies how to chunk the content piece, wherein a respective chunk of the content piece forms a payload of a corresponding reconstructable object;
    a rule that defines a naming convention;
    a rule that specifies a signing key;
    a rule that specifies whether to include a secure catalog; and
    a rule that specifies how to generate the secure catalog based on the set of reconstructable objects.

21. The system of claim 20, wherein extracting the one or more signatures from the set of received signed reconstructable objects involves extracting a signature from each signed reconstructable object, and wherein the method further comprises verifying the signature based on the specified signing key.

22. The system of claim 20, wherein extracting the one or more signatures from the set of received signed reconstructable objects involves extracting a signature from the secure catalog, and wherein the method further comprises verifying the signature based on the specified signing key.

23. The system of claim 20, wherein the method further comprises:
    discarding the secure catalog along with the set of received signed reconstructable objects; and
    in response to receiving a request for the content piece, regenerating the secure catalog based on the rule that specifies how to generate the secure catalog.

24. The system of claim 19, wherein the network is a content-centric network (CCN), and wherein the set of reconstructable objects conforms to a CCN standard.

* * * * *